United States Patent Office

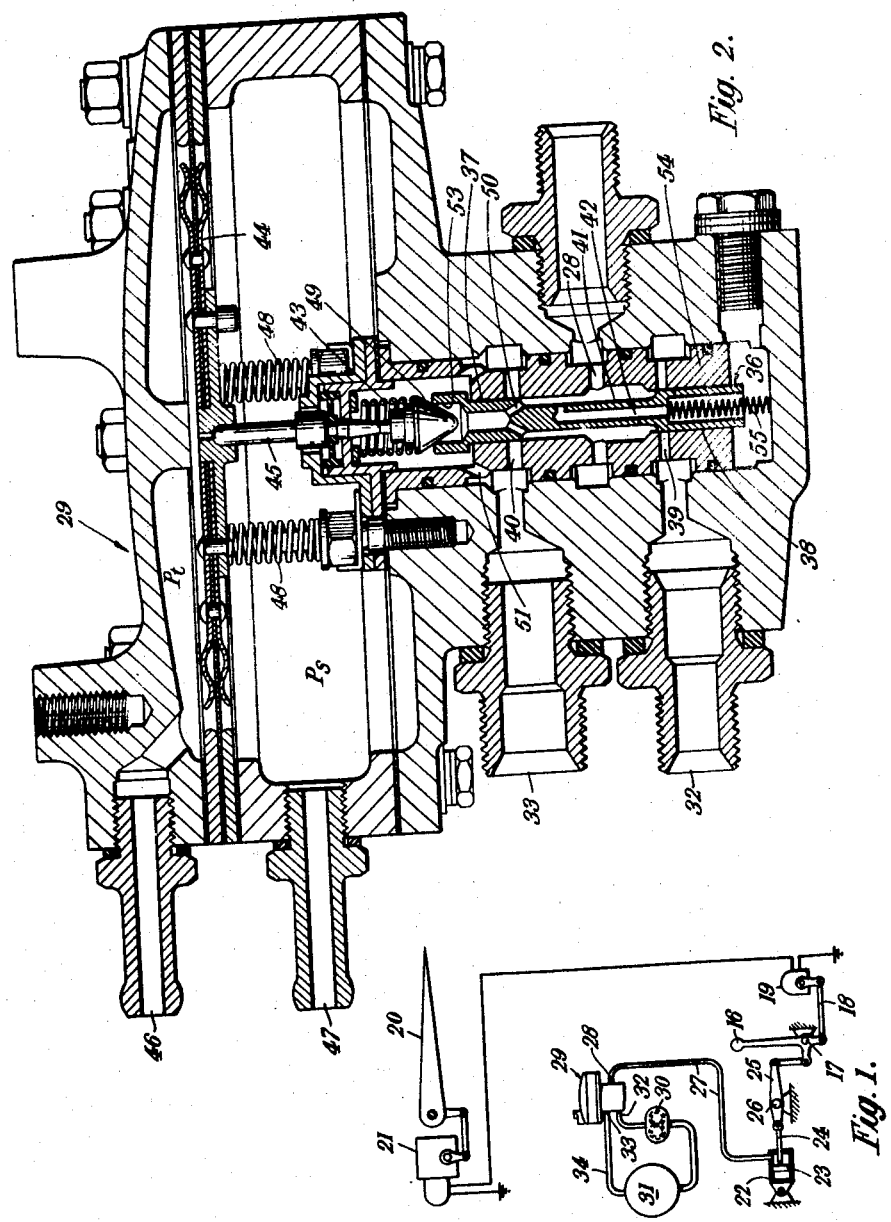

2,830,607

FLUID PRESSURE CONTROL MEANS

Leonard Sidney Greenland, Wolverhampton, and Roy Westbury, Bridgnorth, Salop, England, and Charles Philip Smith, Ramsey, Isle of Man, assignors to H. M. Hobson Limited, London, England, a British company Application November 30, 1955, Serial No. 550,112

Claims priority, application Great Britain December 15, 1954

3 Claims. (Cl. 137—102)

In aircraft fitted with power-operated control surfaces, or in which the control surfaces are operated by servo tabs, the aerodynamic loads on the control surfaces are not felt by the pilot, and it is known to provide the pilot with a feel simulator which will impose on his control member loads representative of the aerodynamic loading on the control surfaces.

In United States application No. 407,536, filed February 1, 1954, we have described and claimed a feel simulator, comprising a linkage operable by the control member to effect relative movement of a piston and a housing for the piston and thereby to displace liquid from the housing against a hydraulic resistance, said linkage being such that the resistance opposing movement of the control member increases progressively with displacement of the control member in either direction from a neutral position, a control valve for controlling the hydraulic pressure prevailing in the housing, and a device responsive to airspeed which is operative on the valve to establish in the housing a hydraulic pressure which varies as a function of airspeed, the control valve being subject to the hydraulic pressure in the housing and also to a force opposing the hydraulic pressure and applied to the control valve by the airspeed responsive device, the control valve normally closing the outlet for liquid from the housing, being movable from its normal position, to increase or decrease the hydraulic pressure in the housing, in response respectively to increase or decrease in the airspeed over a predetermined range of airspeeds and also being movable from its normal position to permit liquid to flow from and to the housing, in response respectively to movement of the control member away from and towards its neutral position.

The relationship between the hinge moment of an aircraft control surface and its angular position in relation to the aircraft varies both with the airspeed and altitude of the aircraft. The control surface angle required to produce a manoeuvre or an acceleration expressed as a given value of "$g$," where $g$ is the value given to the acceleration due to gravity, therefore also varies with speed and altitude. Generally speaking, the object of a feel simulator is to maintain a constant value of stick force per "$g$" irrespective of all other effects.

Subsonically this is approximately fulfilled if the control pressure in the housing is varied in direct proportion to "$q$" (the difference between static atmospheric pressure and the total pressure derived from the forward speed of the aircraft), as described in United States application No. 407,536. Sometimes however, it is required that the graph (normally a straight line) relating, as ordinates, control pressure (i. e. the hydraulic pressure opposing movement of the pilot's control member) and, as abscissae, "$q$" should change its slope at a predetermined value of airspeed. In a preferred form of the feel simulator described and claimed in United States application No. 407,536, the control valve is a piston valve, coacting with pressure and exhaust ports for respectively supplying liquid to and withdrawing liquid from the housing, the airspeed-responsive device applying pressure to the end of the control valve, in opposition to the hydraulic control pressure in the housing acting on the other end of the control valve, through the intermediary of a relief valve held seated against the end of the control valve, against the control pressure which is applied to the relief valve through a duct in the control valve, by a spring assisted by the force developed by the airspeed-responsive device. In the event of seizure of the control valve, the resulting abnormal increase in control pressure will lift the relief valve off its seat to allow liquid to flow from the cylinder to exhaust.

In normal operation, when the pressure exerted on the control valve by the pressure sensitive device decreases, the control valve is moved by the control pressure in the direction to follow the pressure sensitive device. The control pressure acts on a small differential area of the control valve only, and when the control pressure is low there may be a tendency for the control valve to stick in its guide and to avoid any danger of this we provide, according to the present invention, a spring acting on the end of the control valve subject to the control pressure and in the direction to assist the control pressure. To obtain a balanced assembly it is necessary to make a corresponding increase in the strength of the spring acting on the relief valve, with the result that the blow-off pressure required to open the relief valve is somewhat increased. However, the spring loading the control valve ensures satisfactory operation of the valve even at the minimum control pressure.

One embodiment of the invention will now be described in detail, by way of example, with reference to the accompanying drawing in which:

Fig. 1 is a diagram showing a typical installation according to the invention and Fig. 2 is a section through the control unit of the feel simulator.

Fig. 1 shows diagrammatically a pilot's control member 16, pivoted at 17, and coupled by a connection 18 to the transmitter 19 of a servo mechanism for actuating the control surface 20 of an aircraft, the receiver of the servo mechanism being indicated at 21. As will be well understood the servo mechanism 19, 21 serves to displace the control surface 20 in a direction and to an extent determined by the movement of the control member 16 from a neutral position.

The feel simulator comprises a hydraulic jack constituted by a cylinder 22 and piston 23, the piston rod 24 being connected to the control member by a lever 25, pivoted intermediately at 26 and at its ends to the control member and piston rod respectively. Movement of the control member 16 in either direction away from its neutral position will draw the piston 23 to the right to expel liquid from the cylinder 22 through an outlet 35, connected by a signal line 27 to a port 28 in a control unit 29, which determines the hydraulic pressure prevailing in the cylinder 22 of the jack, herein referred to as the control pressure. A pump 30 drawing liquid from a reservoir 31, supplies liquid under pressure to the inlet 32 of the unit 29, which has an exhaust outlet 33 communicating, via a conduit 34, with the reservoir 31.

As will be apparent, the lever 25 works at a progressively decreasing mechanical advantage as the control member 16 is moved away from its neutral position. Consequently the resistance to movement of the control member 16, and therefore the feel imparted by the feel simulator, increases with displacement of the control member. The feel is also varied in accordance with changes in airspeed by the unit 29 as will now be described.

The control unit 29 contains a piston type control valve 36 (Fig. 2) for determining the control pressure prevailing in the jack. The valve 36 has lands 38, 37 coacting respectively with a pressure port 39 and with an exhaust port 40, and a waisted portion 41 communicating, via the port 28, with the signal line 27 (Fig. 1). The control pressure in the jack consequently prevails in the waisted portion 41 of the valve and acts on one end of the valve through a passage 42. The valve 36 is normally held balanced, in the neutral position shown, against the control pressure by the force exerted on the valve by a spring 43, assisted by the pressure exerted on the valve by a diaphragm 44 through the agency of a push rod 45.

The surface of the diaphragm 44 remote from the control valve is subject to total pressure, $P_t$, applied thereto through an inlet 46, and the other side of the diaphragm is subject to static air pressure, $P_s$, applied thereto through an inlet 47. If the airspeed increases, the valve 36 is moved in the direction to connect the pressure port 39 to the outlet 28, so causing the control pressure in the jack to rise to a value at which it can return the valve to its neutral position. On reduction in the airspeed the valve 36 moves in the other direction to connect the outlet 28 to the exhaust port 40, and the control pressure in the jack consequently falls until it reaches the value appropriate to the reduced airspeed.

The valve 36 also moves in opposite directions in response to the movement of the control member towards and away from its neutral position, to permit liquid to flow respectively into and out of the jack through the signal line 27.

Springs 48 maintain the diaphragm out of contact with the push rod 45 at low airspeeds, the control pressure in the jack then being determined solely by the spring 43. As soon, however, as the diaphragm 44 becomes operative, at higher airspeeds, on the push rod 45 the control pressure begins to increase with increasing airspeeds. A relief valve 49 is mounted on the end of the push rod 45 adjoining the control valve 36 and is subjected to the control pressure through a passage 50 in the control valve. It is normally held closed by the push rod assisted by the pressure of the spring 43 as shown. When the control pressure becomes excessive, as the result of seizure of the control valve, the relief valve 49 will lift from its seat and allow liquid to flow from the jack to the exhaust outlet through a passage 51.

As the cross-sectional area of the cavity 53 in the upper end of the control valve 36 against which the relief valve 49 seats is only slightly smaller than the cross-sectional area of the lower end of the control valve, the control pressure exerts an upward force on a small differential area only of the control valve. When, therefore, the control pressure is low, there may be a tendency of the control valve to stick in its guide 54 and fail to move upwards in response to a decrease in the force exerted upon it by the diaphragm 44. To avoid this, a spring 55 is provided beneath the lower end of the control valve, which exerts an upward force on the control valve to assist the control pressure.

If desired, a device sensitive to Mach number or to airspeed may be provided and arranged to act on the diaphragm 44 to modify the characteristics of the feel simulator, as described in United States application No. 407,536, or United States application No. 458,334, filed September 27, 1954, when a given Mach number or airspeed is attained.

What we claim as our invention and desire to secure by Letters Patent is:

1. Apparatus for use in aircraft for establishing in an enclosed space a hydraulic control pressure which varies as a function of airspeed, said device comprising a housing having an inlet port for connection to a source of hydraulic pressure, an exhaust port and an outlet port for connection to said enclosed space, a piston valve movable in a cavity in said housing, a device responsive to airspeed arranged to exert on one end of the piston valve a force which increases with airspeed, said piston being movable in opposite directions from a neutral position in response respectively to increase and decrease in airspeed to connect said outlet port to the inlet port and to the exhaust port respectively and thereby to increase and decrease the hydraulic control pressure prevailing in said enclosed space, a duct connecting the end of said cavity remote from the airspeed-responsive device to said outlet port, a duct connecting the other end of said cavity to said exhaust port, a bore in said one end of the piston valve communicating with said outlet port, a relief valve, a spring normally holding said relief valve seated against the end of said bore, said relief valve moving to connect the outlet port to the exhaust port when the hydraulic control pressure becomes excessive, and a spring acting on the other end of the piston valve in opposition to the airspeed-responsive device.

2. Apparatus as claimed in claim 1, wherein the airspeed-responsive device is a pressure-sensitive device and comprising means for subjecting one side of said device to total air pressure and the other side thereof to static air pressure and a push rod interposed between said device and said relief valve.

3. Apparatus as claimed in claim 2, comprising a spring arranged to maintain said pressure-sensitive device out of contact with said push rod at low airspeeds.

References Cited in the file of this patent
UNITED STATES PATENTS

| | | |
|---|---|---|
| 2,724,565 | Trevaskis | Nov. 22, 1955 |
| 2,751,918 | Higgins et al. | June 26, 1956 |